US008474253B2

(12) United States Patent
Askeland

(10) Patent No.: US 8,474,253 B2
(45) Date of Patent: Jul. 2, 2013

(54) PRESSURE ACCUMULATOR TO ESTABLISH SUFFICIENT POWER TO HANDLE AND OPERATE EXTERNAL EQUIPMENT AND USE THEREOF

(75) Inventor: Tom Kjetill Askeland, Straume (NO)

(73) Assignee: Siem Wis AS, Knarrevik (NO)

( * ) Notice: Subject to any disclaimer, the term of this patent is extended or adjusted under 35 U.S.C. 154(b) by 993 days.

(21) Appl. No.: 11/989,045

(22) PCT Filed: Jul. 12, 2006

(86) PCT No.: PCT/NO2006/000273
§ 371 (c)(1),
(2), (4) Date: Apr. 30, 2009

(87) PCT Pub. No.: WO2007/030017
PCT Pub. Date: Mar. 15, 2007

(65) Prior Publication Data

US 2009/0211239 A1 Aug. 27, 2009

(30) Foreign Application Priority Data

Jul. 18, 2005 (NO) .................................... 20053520

(51) Int. Cl.
*F16D 31/02* (2006.01)

(52) U.S. Cl.
USPC .............................................. 60/398; 60/632

(58) Field of Classification Search
USPC .................................................... 60/632, 398
See application file for complete search history.

(56) References Cited

U.S. PATENT DOCUMENTS

| | | | | | |
|---|---|---|---|---|---|
| 2,979,904 | A | * | 4/1961 | Royer | 60/632 |
| 3,031,845 | A | * | 5/1962 | Ludwig | 60/632 |
| 3,886,745 | A | * | 6/1975 | Kaida et al. | 60/632 |
| 3,933,338 | A | * | 1/1976 | Herd et al. | 251/63.6 |
| 4,074,527 | A | * | 2/1978 | Sadler | 60/325 |
| 4,619,111 | A | * | 10/1986 | Whiteman | 60/632 |
| 4,777,800 | A | | 10/1988 | Hay | |
| 4,815,295 | A | * | 3/1989 | Narum | 60/632 |
| 6,202,753 | B1 | | 3/2001 | Baugh | |
| 6,418,970 | B1 | | 7/2002 | Deul | |

FOREIGN PATENT DOCUMENTS

| | | | |
|---|---|---|---|
| EP | 0 078 031 | A1 | 5/1983 |
| WO | WO 03/025326 | A2 | 3/2003 |

* cited by examiner

*Primary Examiner* — F. Daniel Lopez
(74) *Attorney, Agent, or Firm* — Kilpatrick Townsend & Stockton LLP

(57) ABSTRACT

A pressure accumulator (10) to establish the necessary power to drive and operate external equipment is described, such as hydraulic and/or mechanical systems comprising a main body (12) with an inner, longitudinal, main chamber (14) that is divided into several sub-chambers. The inner, main chamber (14) comprises at least three sub-chambers (14*a*, 14*b*, 14*c*) that are separated from each other with the help of mutual, intermediate pistons (16,18), where the first of said chambers is a compensating chamber (14*a*) arranged to take up the same pressure as the surroundings, the second of said chambers is a gas expansion chamber (14*b*) encompassing a gas generator (20) with an initiator/detonator (22), and the third of said chambers is a pressure chamber (14*c*) arranged to be pressurized with the help of the gas expansion chamber (14*b*) and to exert a force on the external equipment.

26 Claims, 8 Drawing Sheets

PRESSURE ACCUMULATOR TO ESTABLISH SUFFICIENT POWER TO HANDLE AND OPERATE EXTERNAL EQUIPMENT AND USE THEREOF

The present invention relates to a pressure accumulator to establish the power necessary to drive and operate external underwater equipment, such as hydraulic and/or mechanical systems, comprising a main body with an inner, longitudinal, main chamber that is divided into at least three sub-chambers that are separated from each other with the help of mutual, intermediate pistons, where the first of said chambers is a compensating chamber, arranged to tale up the same pressure as the surroundings, and the third of said chambers is a pressure chamber.

The invention concerns systems and methods which normally use an accumulator function to create the necessary energy to be able to drive mechanical or hydraulic systems or equipment, and can be used for systems that have a need for accumulated power to be able to operate, irrespectively of whether the equipment is placed on the ocean bottom, a platform, a vessel, an appliance or ashore. The expression accumulator means a system that has a characteristic which makes it possible to store energy with the help of pumping gas or a liquid into a chamber or container, which, in advance or afterwards, is/becomes exposed to an opposite pressure with the help of a compressed gas, air or a spring function. Such an accumulator function is hereafter denoted by the designation accumulator.

The invention will, in a simplified way, represent an accumulator function that can be initiated according to need. The invention concerns both systems that use the accumulator function directly on the body that shall be activated, as well as systems that use the accumulator function indirectly via hydraulic or pneumatic systems.

The invention will be especially suited to systems with a need for an accumulator function that normally are loaded in advance at a surrounding pressure for thereafter to be moved to a different surrounding pressure. Typical areas are temporary equipment for use on ocean bottom installations. The invention will here be able to contribute to a considerable reduction in need for equipment and volume, something that can be of decisive importance at greater ocean depths.

Today's methods to provide accumulated energy in equipment that shall carry out temporary work on ocean bottom installations are, to a large extent, based on charging an accumulator in advance on the surface to create an available excess pressure in relation to the surroundings. This pressure excess is considerably reduced if the accumulator is lowered to a water-depth of, for example, 2000 meters, where the pressure reduction will be about 200 bar. The reduction in excess pressure is normally compensated for by increasing the accumulator volume, something that in turn is relatively demanding with respect to equipment and space.

A large part of the tasks for an accumulator when it is part of temporary systems to work on water carrying or hydrocarbon carrying ocean bottom installations is to support emergency systems which shall normally not be operated. This leads to a large part of the energy of the accumulator being emergency energy, which is not planned to be used.

From prior art, U.S. Pat. No. 4,777,800, U.S. Pat. No. 6,418,970, U.S. Pat. No. 6,202,753 and EP 0078031, among others, shall be pointed out. The first mentioned document is regarded as the one lying closest in terms of techniques and deals with a pressure accumulator for use in connection with underwater equipment. The pressure accumulator is divided into three sub-chambers, and the pressure accumulator charges itself when being lowered down to the ocean bottom. A pressure accumulator for underwater use with an expansion chamber with a gas generator with a detonator is not known from said documents.

The present invention has an aim to replace parts of a system's need for a pre-charged accumulator, by replacing this with a pressure generating unit that can be activated when needed through combining existing and new technology with new methods and systems.

The pressure accumulator according to the invention preferably comprises a gas generator, preferably a slow-burning explosive unit that is placed in a pressure compensated chamber. The chamber is connected with the body or fluid that shall be exposed to energy, with the help of a piston or a membrane. The main element of the invention, the gas generator, can be initiated with the help of one, or more independent, firing detonators with associated systems.

Several independent gas generator elements with associated initiation systems can also be arranged within the frames of the same pressure compensated chambers to achieve the desired effect and/or redundancy.

The pressure accumulator according to the invention can be put together in a collectable storage to represent both the energy need and redundancy, and also offer possibilities to bring a used system from the store, to replace this with an unused unit, while the main system that has a need for energy is operating. For ocean bottom installations, driving the store can preferably be carried out by an ROV. Furthermore, the pressure chamber and compensating chamber can be fitted with valves that make bleeding of enclosed pressure possible in a safe way when the chamber has been used or has been subjected to higher surrounding pressure than when put together.

To initiate the gas generator via a detonator function, several alternative systems can be used, possibly in combination, to get this done. Both directly connected systems, as well as acoustic systems or other indirect systems can be used.

This invention encompasses a pressure compensated chamber for a gas generator, initiation unit and a piston or bladder/membrane for the transfer of the forces.

The invention does not take into consideration how the forces that are generated are transferred and used, and as such cover any form of such methods.

A preferred embodiment of a pressure accumulator according to the invention is recognised by the characteristic in the independent claim 1, while preferred alternative embodiments are characterised by the independent claims 2-9.

A preferred application area is defined in the independent claim 10 with associated dependent claim 11.

Advantages with a pressure accumulator according to the invention are that it can be without energy until initiated and it can be initiated according to need. The invention can, in principle, be used both on systems/equipment on land, offshore, in space, as well as on ocean bottom systems. It can be fitted in collectable stores that are coupled (electrically and hydraulically), for example, on the ocean bottom with the help of a ROV. It can be connected in parallel to obtain the desired effect and/or redundancy. It can be fitted directly on equipment (for example a valve actuator) that has a need for energy. Excess pressure can be depressurized in a safe way in a workshop/on deck, and the equipment/invention can be reused after being made ready.

Other advantages are that the pressure accumulator can be equipped with all firing mechanisms that are normally commercially available, or with specially designed solutions. For example, it can be equipped with a detonator/initiator that is of the so called safe type, i.e. there is no need, for example, for radio silence or other system closures, or it can be fitted with redundant initiator/detonator systems, preferably of a different make, or from different production batches. It can be initiated either with the help of direct electric or hydraulic signals, or with the help of indirect firing methods such as acoustics and electromagnetism, and it can be fitted with all gas generators (slow burning powder charge) that are normally available commercially, or with specially designed solutions.

The invention shall now be described in more detail with reference to the enclosed figures, in which.

Figure 1:
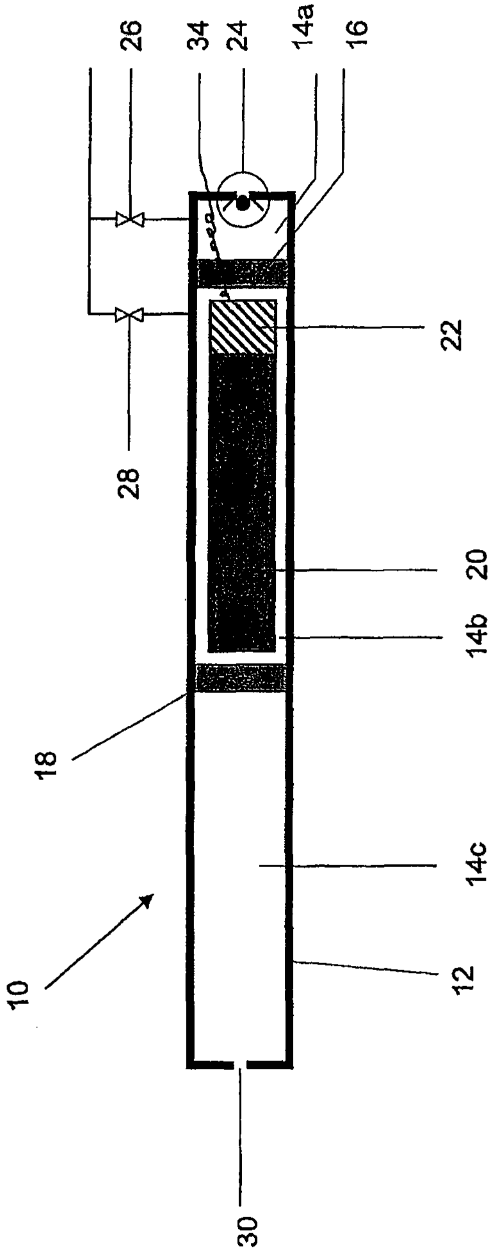
FIG. 1 shows an embodiment of a pressure accumulator according to the invention.

A preferred embodiment of a pressure accumulator 10 to establish the power necessary to drive and operate external equipment, such as hydraulic and/or mechanical systems, comprises a main body 12 with an inner, longitudinal, main chamber 14 that is divided into several sub-chambers. The inner, main chamber 14 stretches preferably along the whole of the length of the main body and comprises a plurality, at least three, sub-chambers 14*a*, 14*b*, 14*c*, that are separated from each other with the help of mutual, intermediate pistons 16, 18. The first of said chambers is a compensating chamber 14*a* arranged to take up the same pressure as the surroundings, the second of said chambers is a gas expansion chamber 14*b* comprising a gas generator 20 with an initiator/detonator 22, and the third of said chambers is a pressure chamber 14*c* set up to be pressurised with the help of the gas expansion chamber 14*b* and to exert a force on the external equipment.

FIG. 1 shows a typical construction of the invention when it is used to generate pressure against the pressure chamber 14*c*. As the figure shows, a gas generator 20 is arranged with associated initiator/detonator 22 between two pistons 16, 18 inside the sleeve-formed main body 12. The inner, main chamber 14 is, as shown in the figure, preferably divided into three chambers with the help of said pistons 16, 18. The compensating chamber 14*a* is separated from the gas expansion chamber 14*b* with the help of a compensating piston 16. The gas expansion chamber 14*b* is in turn separated from the pressure chamber 14*c* with the help of the pressure piston 18. The pistons 16, 18 represent a movable pressure barrier between the chambers.

Furthermore, valves 26,28 are set up to be able to bleed pressure from the compensating chamber and/or the gas expansion chamber 14*a* and 14*b*, respectively. In the compensating chamber 14*a*, a non-return valve 24 is arranged that prevents pressure from the chamber being released again. The pressure chamber 14*c* contains a medium in the form of, for example, liquid or gas, which shall be pressurised. The pressure chamber 14*c* comprises, at one end, an outlet 30 that is coupled to the system which shall make use of the pressure. A bladder, membrane or the like (not shown) can be arranged to said end or outlet opening for the transfer of pressure to the external equipment.

The gas generator 20 in the gas expansion chamber 14*b* can preferably be a slow-burning (deflating) explosive charge (slow burning powder charge). The initiator 22 can be of several shapes and principles that are appropriate with the actual gas generator and function requirements (temperature and firing safety in particular). An electric wire 34 can preferably be led into the initiator/detonator 22 from the outside via special pressure resistant penetrations with an electric conductor inside to be able to trigger the initiator/detonator and thereby the gas generator.

Figure 2:
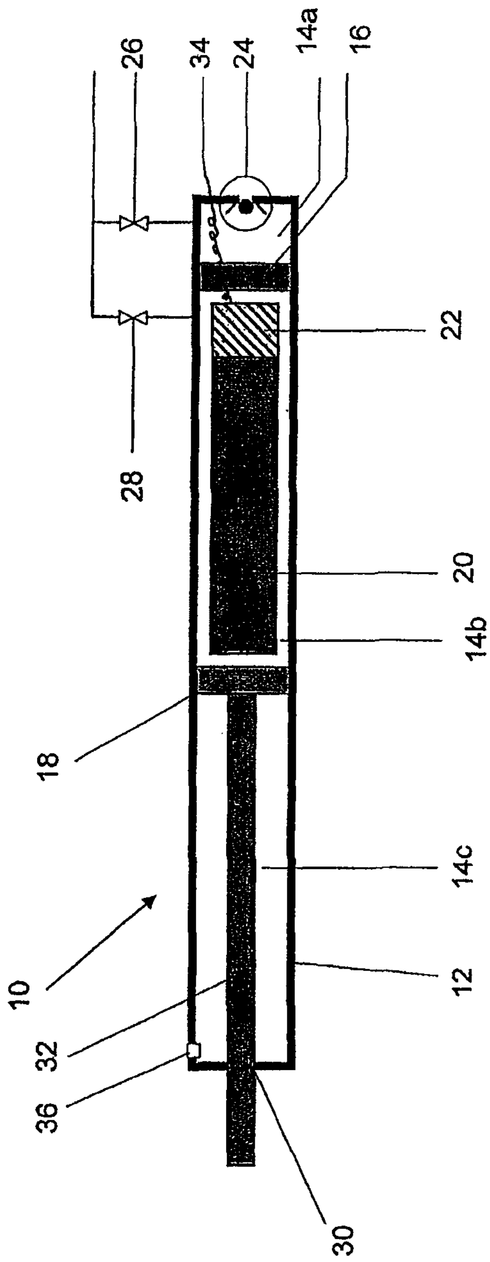
FIG. 2 shows an alternative preferred embodiment of a pressure accumulator according to the invention.

FIG. 2 shows an alternative preferred embodiment that is built up after the same principle as mentioned in connection with FIG. 1, with the exception that the pressure that is generated in the gas expansion chamber 14*c* is transferred directly to a shaft 32 via the pressure piston 18. In this configuration, a valve function 36 is arranged in the sleeve so that any liquid or gas shall be able to evacuate without creating a possible locking situation. A bladder, membrane or the like can also be used here if desired for transfer of pressure to the external equipment.

Figure 3:
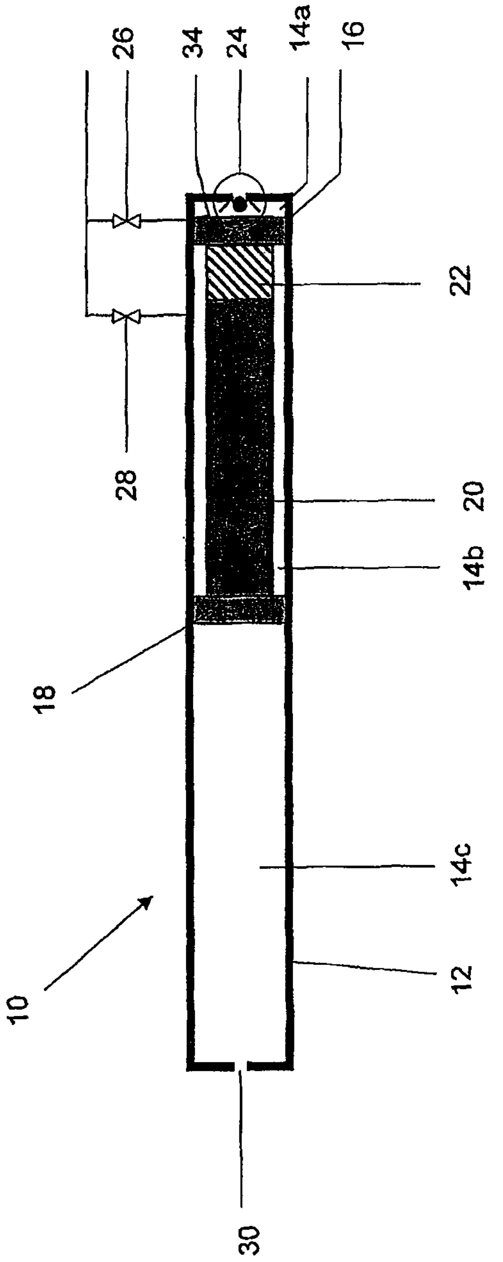
FIG. 3 shows a pressure accumulator as shown in FIG. 1 at atmospheric pressure.

FIG. 3 shows an embodiment of the present invention as described for FIG. 1. The pressure accumulator 10 has been made ready under atmospheric surroundings. As can be seen in the drawing, the compensating chamber 14*a* is now reduced to a minimum with an atmospheric pressure, and the counterpressure in the pressure chamber 14*c* also corresponds to the atmospheric pressure.

Figure 4:
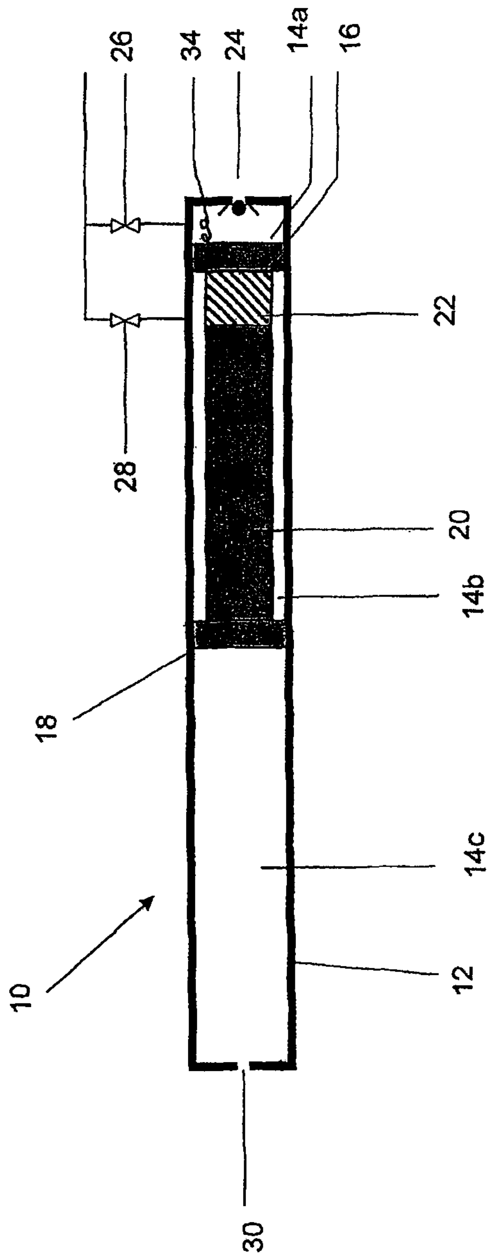
FIG. 4 shows a pressure accumulator as shown in FIG. 1 at a surrounding pressure that is higher that atmospheric pressure.

FIG. 4 shows an embodiment of the present invention as described in FIG. 3. As an example, the pressure accumulator 10 is here lowered to an ocean depth of 2000 meters. As can be seen in the drawing, the compensating chamber 14*a* has now been supplied the same pressure as the surroundings. This leads to the pressure accumulator 10 obtaining full effect from the pressure that shall be generated in the gas expansion chamber 14*c* without first having to overcome the surrounding pressure.

Figure 5:
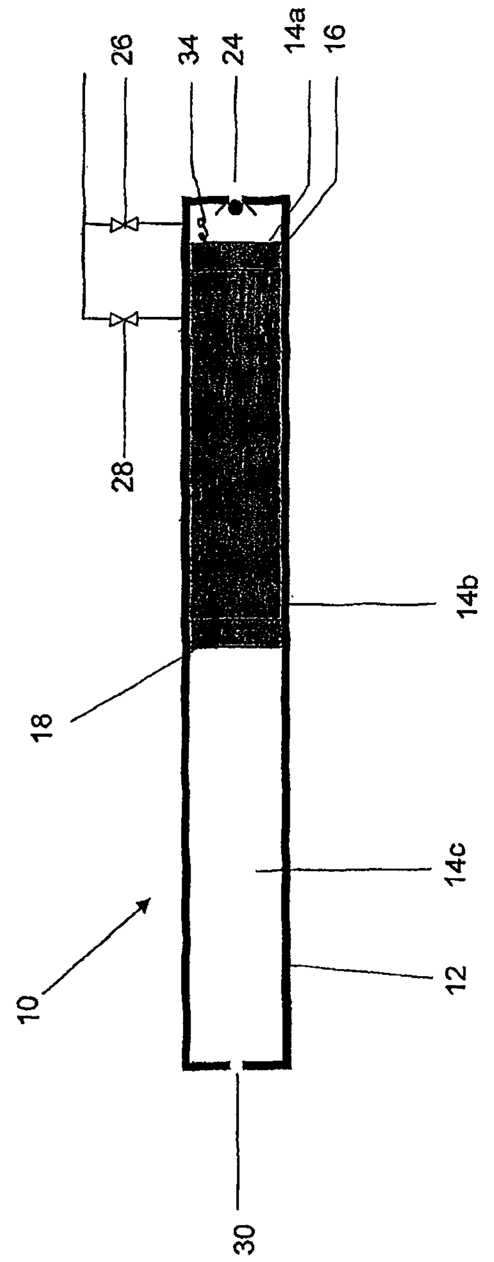
FIG. 5 shows a pressure accumulator as shown in FIG. 4 which is initiated.

FIG. 5 shows the pressure accumulator as described in FIG. 4, with the difference that the gas generator 20 is initiated with the help of the initiator/detonator 22 and that the build-up of pressure has taken place. The pressure accumulator 10 is now pressurised and represents stored, available energy.

Figure 6:
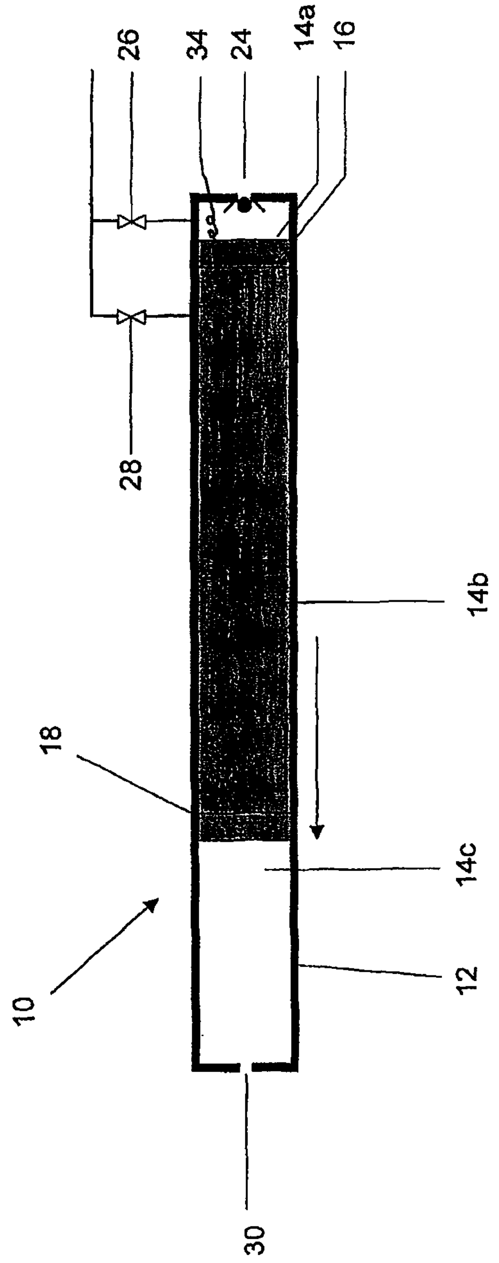
FIG. 6 shows the function of a pressure accumulator shown in FIG. 5.

FIG. 6 shows the pressure accumulator as described in FIG. 5, with the difference that it has a consumption of energy from the pressure chamber 14*c*, which in turn leads to a position change by the pressure piston 18, and a reduction of remaining energy in the pressure chamber 14*c*.

Figure 7:
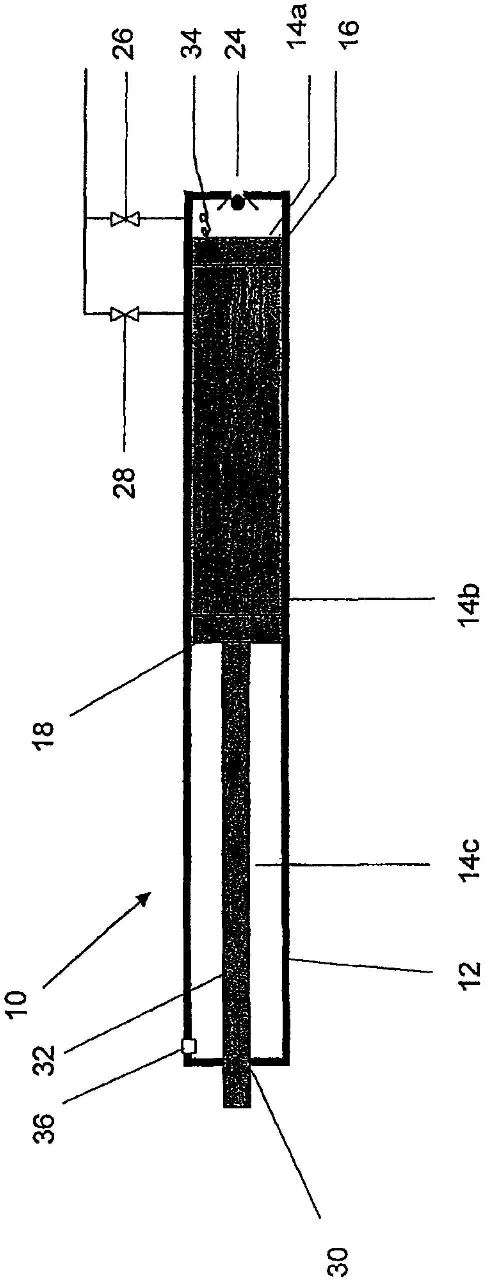
FIG. 7 shows a pressure accumulator as shown in FIG. 2, where the build up of pressure has taken place.

FIG. 7 shows the pressure accumulator as described in FIG. 2, where the gas generator 20 is initiated with the help of the initiator/detonator 22 and the pressure build-up has taken place.

Figure 8:
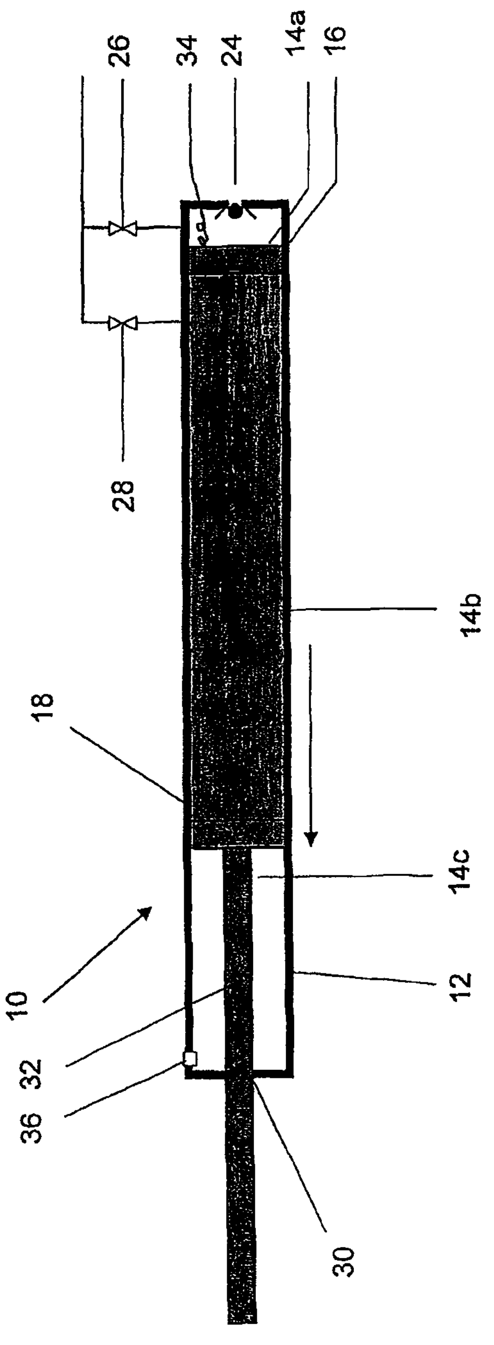
FIG. 8 shows the function of a pressure accumulator as shown in FIG. 7, at a surrounding pressure that is higher than atmospheric pressure.

FIG. 8 shows the pressure accumulator as described in FIG. 7 where the pressure build-up has exerted a large enough force onto the pressure piston 18 and the shaft 32 that this has changed position to an activated position.

The invention claimed is:

1. A pressure accumulator device for driving and operating external underwater equipment comprising:

- a main body having an inner longitudinal, main chamber, wherein the main chamber is divided into three sub-chambers that are separated by mutual, intermediate pistons providing a first sub-chamber, a second sub-chamber, and a third sub-chamber, wherein the first sub-chamber is a compensating chamber comprising a non-return valve, the second sub-chamber is a gas expansion chamber comprising a gas generator, and the third sub-chamber is a pressure chamber, wherein the pressure chamber is pressurized by the gas expansion chamber and the pressure chamber is adapted to exert a force on an external system the external underwater equipment.

2. The pressure accumulator device of claim 1, wherein the external underwater equipment comprises a hydraulic system.

3. The pressure accumulator device of claim 1, wherein the external underwater equipment comprises a mechanical system.

4. The pressure accumulator device of claim 1, wherein one of the pistons is a compensating piston positioned between the compensating chamber and the gas expansion chamber.

5. The pressure accumulator device of claim 1, wherein one of the pistons is a pressure piston positioned between the gas expansion chamber and the pressure chamber.

6. The pressure accumulator device of claim 1, wherein the compensating chamber is adapted to reach a pressure equal to the same pressure as the surroundings of the device.

7. The pressure accumulator device of claim 1, wherein the compensating chamber comprises a bleed valve.

8. The pressure accumulator device of claim 1, wherein the gas expansion chamber comprises a bleed valve.

9. The pressure accumulator device of claim 1, wherein the gas generator comprises a slow-burning, explosive material.

10. The pressure accumulator device of claim 1, wherein the gas generator comprises a chemical material.

11. The pressure accumulator device of claim 1, wherein the pressure chamber comprises an outlet opening, wherein the outlet opening is adapted to release outlet pressure to exert the force on the external underwater equipment.

12. The pressure accumulator device of claim 1, wherein the pressure chamber further comprises a valve adapted to evacuate a fluid from the pressure chamber.

13. A method of operating underwater equipment comprising providing a pressure accumulator device comprising a main body having an inner longitudinal, main chamber, wherein the main chamber is divided into three sub-chambers that are separated by mutual, intermediate pistons that provide a first sub-chamber, a second sub-chamber, and a third sub-chamber, wherein the first sub-chamber is a compensating chamber comprising a non-return valve, the second sub-chamber is a gas expansion chamber comprising a gas generator, and the third sub-chamber is a pressure chamber;

allowing the compensating chamber to reach a pressure equal to the same pressure as the surroundings of the device;

pressurizing the pressure accumulator device; and exerting a force on external underwater equipment engaged with the pressure accumulator device.

14. The method of claim 13, wherein the external underwater equipment comprises an ocean bottom well system.

15. The method of claim 13, wherein the gas generator is coupled with an initiator.

16. The method of claim 13, wherein the gas generator is coupled with an initiator and a detonator.

17. The method of claim 13, wherein pressurizing the pressure accumulator device comprises initiating the gas generator such that pressure builds up in the gas expansion chamber to change the position of a pressure piston separating the gas expansion chamber and the pressure chamber.

18. The method of claim 17, wherein initiating the gas generator comprises utilizing a direct electric signal.

19. The method of claim 17, wherein initiating the gas generator comprises utilizing a direct hydraulic signal.

20. The method of claim 17, wherein initiating the gas generator comprises utilizing an indirect firing system.

21. The method of claim 20, further comprising an acoustics indirect firing system.

22. The method of claim 20, further comprising an electromagnetic indirect firing system.

23. A pressure accumulator device for driving and operating external underwater equipment comprising:

a main body having an inner longitudinal, main chamber, wherein the main chamber is divided into three sub-chambers that are separated by mutual, intermediate pistons providing a first sub-chamber, a second sub-chamber, and a third sub-chamber, wherein the first sub-chamber is a compensating chamber comprising a non-return valve, the second sub-chamber is a gas expansion chamber comprising a gas generator, and the third sub-chamber is a pressure chamber, wherein the pressure chamber is pressurized by the gas expansion chamber and the pressure chamber is adapted to exert a force on the external underwater equipment upon release of the pressure in the pressure chamber.

24. The pressure accumulator device of claim 23, wherein one of the pistons is a pressure piston positioned between the gas expansion chamber and the pressure chamber.

25. The pressure accumulator device of claim 24, wherein the pressure piston comprises a shaft that extends out through an outlet opening in the pressure chamber.

26. The pressure accumulator device of claim 25, wherein the shaft is engaged with the external underwater equipment and upon the release of pressure in the pressure chamber, the shaft exerts the force on the external underwater equipment.

* * * * *